United States Patent
Shi (10) Patent No.: US 12,253,633 B2
(45) Date of Patent: Mar. 18, 2025

(54) LASER RANGING METHOD, DEVICE, AND LIDAR

(71) Applicant: SUTENG INNOVATION TECHNOLOGY CO., LTD., Shenzhen (CN)

(72) Inventor: Zhaohui Shi, Shenzhen (CN)

(73) Assignee: SUTENG INNOVATION TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 18/636,214

(22) Filed: Apr. 15, 2024

(65) Prior Publication Data

US 2024/0361436 A1    Oct. 31, 2024

(30) Foreign Application Priority Data

Apr. 27, 2023  (CN) .......................... 202310465605.7

(51) Int. Cl.
G01S 7/48     (2006.01)
G01S 7/486    (2020.01)
G01S 17/10    (2020.01)

(52) U.S. Cl.
CPC ............ *G01S 7/4868* (2013.01); *G01S 17/10* (2013.01)

(58) Field of Classification Search
CPC ...... G01S 7/4868; G01S 17/10; G01S 7/4911; G01S 1/00
See application file for complete search history.

(56) References Cited

U.S. PATENT DOCUMENTS

| 5,029,023 A * | 7/1991 | Bearden ................. G11B 7/004 |
| | | 369/69 |
| 2012/0183104 A1* | 7/2012 | Hong ...................... H03L 7/085 |
| | | 375/340 |
| 2022/0206116 A1* | 6/2022 | Wang ...................... G01S 7/484 |

FOREIGN PATENT DOCUMENTS

| CN | 115542297 A | 12/2022 |
| JP | 2003114277 A | 4/2003 |

OTHER PUBLICATIONS

First Office Action issued in related Chinese Application No. 202310465605.7, mailed Jun. 5, 2023, 12 pages.

* cited by examiner

*Primary Examiner* — Hovhannes Baghdasaryan
(74) *Attorney, Agent, or Firm* — BAYES PLLC (57) ABSTRACT

Embodiments of the present application provide a laser ranging method, device, and a LiDAR. The method includes: obtaining the quantity of light leading point cloud points in a first preset region in the current frame of point cloud, where the light leading point cloud points are point cloud points corresponding to echoes received by a receiver within a light leading period, and the light leading period is a period less than a first preset duration, starting from an emission moment of a laser beam corresponding to the light leading point cloud points; and adjusting the gain of the receiver within the light leading period to reduce the quantity of the light leading point cloud points.

13 Claims, 5 Drawing Sheets

S101 — Obtaining a quantity of light leading point cloud points in a first preset region in a current frame of point cloud S102 — Adjusting a gain of a receiver within a light leading period to reduce the quantity of the light leading point cloud points, when the quantity of the light leading point cloud points satisfies a first preset condition

LASER RANGING METHOD, DEVICE, AND LIDAR

CROSS-REFERENCE TO RELATED APPLICATION

The present application claims the benefit of priority to Chinese Patent Application No. 202310465605.7, filed on Apr. 27, 2023, which is hereby incorporated by reference in its entirety.

TECHNICAL FIELD

This application relates to the field of LiDAR, particularly to a laser ranging method, device, and LiDAR.

TECHNICAL BACKGROUND

A LIDAR includes components such as an emission system, a receiving system, and a data processing system. It measures the distance by calculating the time difference between the emitted detection laser and the received echo laser. A LiDAR has advantages such as high resolution, high sensitivity, strong anti-interference ability, and independence from lighting conditions. It has been widely used in areas such as autonomous driving, logistics vehicles, robots, vehicle-road coordination, and smart public transportation. A LiDAR is commonly used in various environments, such as rainy or snowy weather, humidity, windblown sand, dust, etc. These environments can easily cause contamination on the emission and reception optical paths of the LiDAR, for example, slight contamination on the window or internal optical components of the LiDAR. Contamination on the emission and reception optical paths can absorb or reflect some of the laser beams, interfering with the LiDAR's detection of objects.

SUMMARY

Embodiments of this application provide a laser ranging method, device, and LiDAR that can reduce the impact of contamination and other factors on normal detection.

First aspect of embodiments of the application provides a laser ranging method, including:
  obtaining a quantity of light leading point cloud points in a first preset region in a current frame of point cloud;
    where the light leading point cloud points are point cloud points corresponding to echoes received by a receiver within a light leading period, the light leading period is a period less than a first preset duration, starting from an emission moment of a laser beam corresponding to the light leading point cloud points; and when the quantity of the light leading point cloud points satisfies a first preset condition, adjusting a gain of the receiver within the light leading period to reduce the quantity of the light leading point cloud points.

In an embodiment, when the quantity of the light leading point cloud points satisfies a first preset condition, adjusting the gain of the receiver within the light leading period to reduce the quantity of the light leading point cloud points includes: when the quantity of the light leading point cloud points is greater than a preset threshold, reducing the gain of the receiver within the light leading period.

In an embodiment, before adjusting the gain of the receiver within the light leading period when the quantity of the light leading point cloud points satisfies the first preset condition, the method further includes: determining the preset threshold according to a current scanning mode, where the current scanning mode is one of at least two scanning modes, and preset thresholds corresponding to the at least two scanning modes have different values.

In an embodiment, adjusting the gain of the receiver within the light leading period to reduce the quantity of the light leading point cloud points includes: adjusting a phase of the gain curve of the receiver within the light leading period, to reduce the quantity of the light leading point cloud points.

In an embodiment, the method further includes: performing at least one adjustment determination, where the adjustment determination includes determining a next adjustment mode according to a quantity of at least some valid point cloud points before and after the most recent gain adjustment; and after each adjustment determination, adjusting the gain of the receiver within the light leading period according to the next adjustment mode, where the valid point cloud point is a point cloud point in the frame of point cloud except for the light leading point cloud point.

In an embodiment, performing at least one adjustment determination includes: obtaining a first quantity and a second quantity, where the first quantity is determined according to a quantity of valid point cloud points in a second preset region in at least one frame of point cloud generated before adjustment, and the second quantity is determined according to a quantity of valid point cloud points in the second preset region in at least one frame of point cloud generated after adjustment; and determining the next adjustment mode of the gain of the receiver within the light leading period according to the first quantity and the second quantity.

In an embodiment, determining the next adjustment mode of the gain of the receiver within the light leading period according to the first quantity and the second quantity includes at least one of the following:
  a) when a difference between the second quantity and the first quantity is greater than a first threshold, the next adjustment mode includes further reducing the gain of the receiver within the light leading period;
  b) when the difference between the first quantity and the second quantity is greater than a second threshold, the next adjustment mode includes increasing the gain of the receiver within the light leading period; or
  c) when the difference between the second quantity and the first quantity is not greater than the first threshold or the difference between the first quantity and the second quantity is not greater than the second threshold, the next adjustment mode includes restoring the gain of the receiver within the light leading period to the gain before the most recent adjustment.

In an embodiment, the first preset region is the same as the second preset region.

In an embodiment, the first preset region and/or the second preset region include at least a part of a region within a field of view below a horizontal line.

In an embodiment, the first preset region and/or the second preset region are the regions with the highest point cloud density in the field of view below a horizontal line.

In an embodiment, when the quantity of the light leading point cloud points in the frame of point cloud obtained after the most recent adjustment of the gain does not satisfy the first preset condition, the method further includes: stopping the adjustment determination and stopping the next adjustment of the gain of the receiver within the light leading period.

In an embodiment, the method further includes: when the quantity of the light leading point cloud points does not satisfy the first preset condition, restoring the gain of the receiver within the light leading period to a default value.

In an embodiment, obtaining the quantity of the light leading point cloud points in the first preset region in the current frame of point cloud includes: when a quantity of the point cloud points in the first preset region in the current frame of point cloud is greater than a quantity of point cloud points in a third preset region, and the difference between the quantity of the point cloud points in the first preset region and the quantity of the point cloud points in the third preset region satisfies a second preset condition, obtaining the quantity of the light leading point cloud points in the first preset region in the current frame of point cloud, where the third preset region is a partial region in a field of view corresponding to the current frame of point cloud, except for the first preset region.

In an embodiment, the first preset region is below a horizontal line in the field of view, and the third preset region is above the horizontal line in the field of view.

Second aspect of embodiments of the present application provides a laser ranging device, including: an obtaining module configured to obtain a quantity of light leading point cloud points in a first preset region in a current frame of point cloud, where the light leading point cloud points are point cloud points corresponding to echoes received by a receiver within a light leading period, which is a period less than a first preset duration, starting from an emission moment of a laser beam corresponding to the light leading point cloud points; and an adjusting module configured to adjust the gain of the receiver within the light leading period to reduce the quantity of the light leading point cloud points when the quantity of the light leading point cloud points satisfies a first preset condition.

Third aspect of embodiments of the present application provides a LiDAR, including: a processor; and a memory on which executable codes are stored, when executed by the processor, the executable codes cause the LiDAR to perform any one of the laser ranging methods as described.

Fourth aspect of embodiments of the present application provides a computer-readable storage medium on which executable codes are stored, when executed by the processor of a LiDAR, the executable codes cause the LiDAR to perform any one of the laser ranging methods as described.

In the embodiments of this application, by obtaining the quantity of light leading point cloud points in the first preset region in the current frame of point cloud, which are the point cloud points corresponding to echoes received within the light leading period, the method detects whether the LiDAR is affected by contamination or other factors that may impact normal detection. When the condition is met, the gain of the receiver within the light leading period is adjusted to reduce the quantity of light leading point cloud points, thereby reducing the impact of contamination on normal detection.

BRIEF DESCRIPTION OF DRAWINGS

To more clearly describe the technical solution in the embodiments of this application, a brief description of the drawings required in the embodiments or the related art description to be used below is given. The following description of the drawings is only some embodiments of this application.

DETAILED DESCRIPTION

The following detailed description of the embodiments of the present application will be described with reference to the drawings. The terms used in this application are solely for the purpose of describing embodiments. The singular forms "a," "an," and "the" used in specification and the appended claims are intended to include the plural forms unless the context clearly indicates otherwise. The term "and/or" used herein refers to any or all possible combinations of one or more of the associated listed items.

Terms such as "first," "second," "third," etc., are used to describe various information. These terms are only used to distinguish the same type of information from each other. For example, the first information can also be referred to as the second information, and similarly, the second information can also be referred to as the first information. Therefore, features labeled with "first," "second," etc., may explicitly or implicitly include one or more of those features. In the description and claims of this application, the meaning of "multiple" is two or more, unless otherwise specifically defined.

A LIDAR is a radar system that detects the position, velocity, and other characteristics of targets by emitting laser beams. The LiDAR involves sequentially emitting multiple laser beams using a laser emitter. When a laser beam encounters an object, it is reflected, and the receiver captures this reflected echo, then calculates the time difference between receiving the reflected echo and emitting the laser beam, which represents the flight time of the laser beam. Based on this flight time, parameters such as the distance and azimuth of the object that reflected the echo, enabling detection of the surrounding environment are calculated.

A LiDAR generally includes a transceiver module and a processing module. The transceiver module converts electrical signals into optical signals for transmission, then reconverts the light signals reflected by objects back into electrical signals. The processing module calculates relevant information based on the electrical signals. In some embodiments, the LiDAR may also include a scanning module (such as MEMS mirrors) to change the emission direction of the laser beam to achieve scanning of the laser beam within a certain field of view. The path of the reflected echo and the emitted laser can be coaxial, with the reflected echo returning along the same path through the scanning module to the transceiver module, where it is received by the receiver. The LiDAR can be single-channel scanning or can achieve multi-channel simultaneous or interleaved scanning. In the case of multi-channel scanning, it can be implemented through multiple sets of transceiver modules, with the optical paths (emitted laser and reflected echo) between channels isolated from each other.

After the LiDAR calculates parameters such as distance and azimuth based on the reflected echo, an object reflecting the echo is represented by a point cloud point. By collecting point cloud points over a continuous period of time, a frame of point cloud can be obtained. Generally, the duration of each frame of point cloud output by the LiDAR is the same, meaning that the points collected within a fixed period are output as a frame of point cloud. In some cases, point cloud frames can also be output at variable frequencies.

In a LiDAR, when obtaining the reception time of the echo, generally the signal with the maximum amplitude among all sampled signals is taken as the signal corresponding to the object reflecting the echo. Due to the fact that structural components or optical elements inside or on the surface of the LiDAR may reflect or scatter a part of the emitted laser beam, the part of the laser beam that is reflected or scattered before emission is received by the receiver shortly after the laser beam is emitted, resulting in the receiver sampling a signal in a short period after the laser beam emission. This part of signal is referred to as the light leading signal. A LiDAR may experience slight contamination on the window or internal optical elements due to various factors. This contamination can enhance the light leading signal reflected or scattered inside or on the surface of the LiDAR, weaken the emitted laser beam, interfere with the LiDAR's detection of objects. For example, the contamination may cause the echo reflected by the contamination to be mistakenly detected as the signal corresponding to the detected object, leading to the loss of the actual object reflecting the echo. Alternatively, the amplitude of the light leading signal may increase, causing the amplitude of the echo reflected by nearby objects to decrease, making it easy to lose the echo corresponding to the object during sampling, thus affecting the object detection capability of the LiDAR. In embodiments of this application, a quantity of light leading signals is detected to determine whether the light leading signals will affect the reflection signals of objects, and corresponding measures are taken to reduce this impact. The laser ranging method will be further illustrated with reference to FIG. 1.

Figure 1:
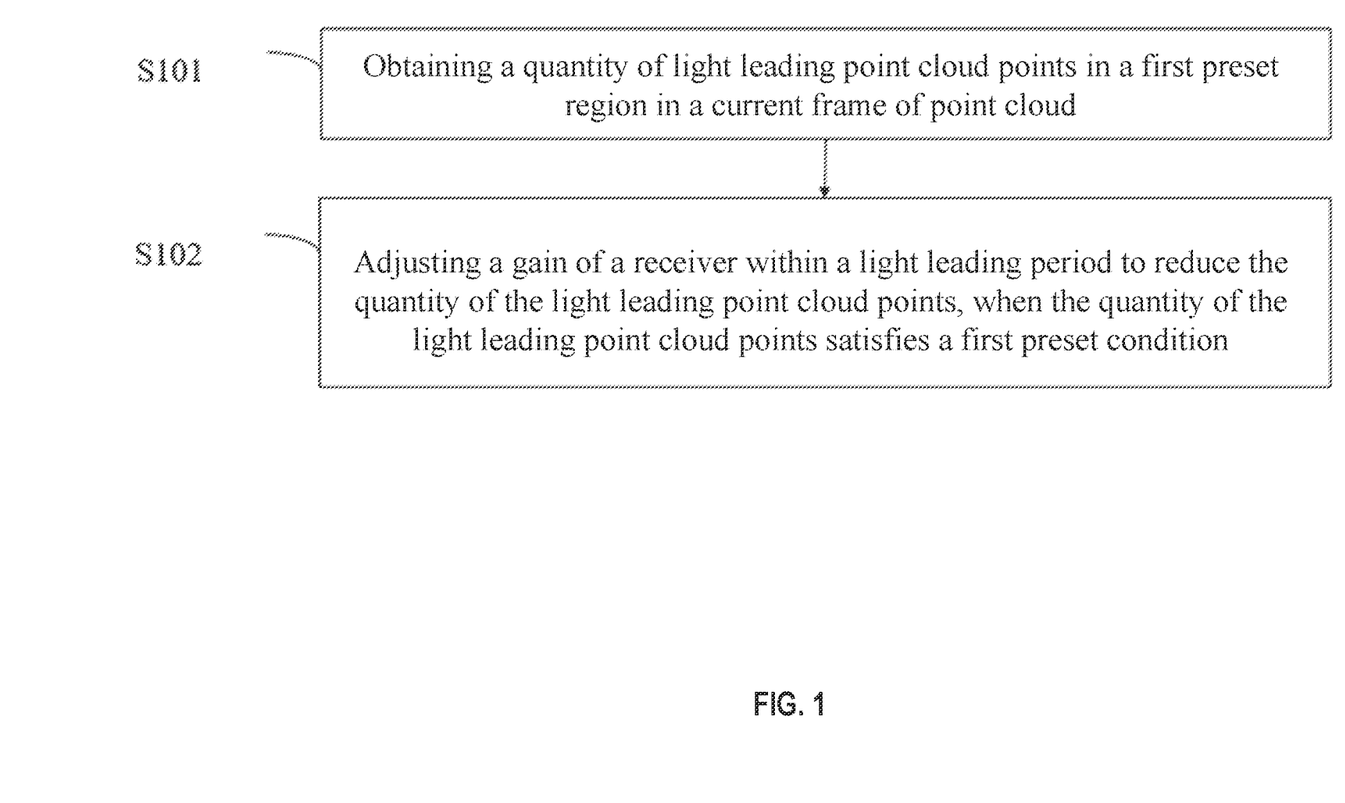
FIG. 1 illustrates a schematic diagram of an embodiment of the laser ranging method, according to an embodiment of this application.

FIG. 1 illustrates a schematic diagram of an embodiment of the laser ranging method, according to an embodiment of this application. The laser ranging method includes the following steps.

Step S101, obtaining a quantity of light leading point cloud points in a first preset region in a current frame of point cloud.

The light leading point cloud points are point cloud points corresponding to echoes received by a receiver within a light leading period. In some embodiments, a LiDAR utilizes a laser emitter to sequentially emit multiple laser beams and a receiver to receive echoes of at least part of the multiple laser beams. The current frame of point cloud is generated based on the echoes. The light leading period is a period starting from the emission moment of the laser beam corresponding to the light leading point cloud points, and the light leading period is less than a first preset duration. Theoretically, this first preset duration equals the flight time of the laser beam emitted by the LiDAR reflected by the LiDAR's window glass and received by the receiver. In an embodiment, the first preset duration can be equal to maximum flight time or slightly greater than the maximum flight time. The first preset duration can be obtained through calibration by the LiDAR. After calibration, the first preset duration T1 can be obtained. By counting the number of point cloud points with reception time from 0 to T1 in the first preset region in the current frame of point cloud, the quantity of the light leading point cloud points in the first preset region can be obtained.

The first preset region can be a partial region or the entire region in the current frame of point cloud. This first preset region can be a default value or determined based on the current frame of point cloud. In an embodiment, the first preset region includes at least a part of a region within the field of view below a horizontal line. In an embodiment, the first preset region is the region below the horizontal line in the field of view with the highest point cloud density.

Step S102, adjusting a gain of the receiver within a light leading period to reduce the quantity of the light leading point cloud points, when the quantity of the light leading point cloud points satisfies a first preset condition.

After the receiver converts the light signal reflected back by an object into an electrical signal, the electrical signal is generally amplified for signal detection convenience. In an embodiment, the receiver may amplify the electrical signal at least once. Taking the case of amplifying the electrical signal three times, the receiver includes a photoelectric conversion unit, a trans-impedance amplification circuit, and a second-stage amplification circuit. The gain of the output electrical signal can be controlled by a bias voltage in the photoelectric conversion unit, the trans-impedance amplification circuit performs first-stage amplification on the electrical signal, the second-stage amplification circuit performs second-stage amplification on the electrical signal, and then the reception time is detected based on the signal after the second-stage amplification. In this example, the adjustment of the gain of the receiver within the light leading period can be achieved by adjusting the gain of any one, two, or all of the circuits including the photoelectric conversion unit, the trans-impedance amplification circuit, and the second-stage amplification circuit, to adjust the total gain.

Due to limitations in hardware response speed, the gain of the receiver can hardly be set to 0 within the light leading period, and can hardly instantaneously increase the gain to a preset value after the light leading period. Therefore, in some embodiments, the gain of the receiver is calibrated to determine the gain of the receiver within and after the light leading period, so that the LiDAR has the highest point cloud data gain. The gains obtained from the calibration for the receiver within and after the light leading period can be the same or different.

In an embodiment, when the quantity of light leading point cloud points in the first preset region is greater than a preset threshold, the gain of the receiver within the light leading period is reduced. When the quantity of light leading signals exceeds the preset threshold, it indicates that the increase in stray light generated on optical components such as window slices due to factors like dirt and contamination causes the light leading signals to strengthen. The gain of the receiver within the light leading period is too high, resulting in the light leading signals (electrical signals corresponding to the light leading point cloud points) being detected better than the object echo signals. By reducing the gain within the light leading period, the impact of the light leading signals on the object echo signals can be reduced.

In an embodiment, before step S102, the preset threshold is determined based on the current scanning mode. The current scanning mode is one of at least two scanning modes, where the preset thresholds corresponding to the at least two scanning modes have different values. The scanning mode refers to the scanning path and/or scanning density of the LiDAR. Different scanning modes have different scanning paths and/or different scanning densities. For example, in some scanning modes, the LiDAR uniformly scans the field of view, while in other scanning modes, the LiDAR scans different parts of the field of view with varying scanning densities. In different scanning modes, the point cloud density in the first preset region may be different, and the preset threshold used to determine whether the light leading point cloud points are abnormal may also be different. Hence, different preset thresholds can be set for different scanning modes.

In the embodiments of the present application, by detecting whether the quantity of light leading point cloud points in the first preset region satisfies the first preset condition, it is determined whether there are factors such as dirt that affect normal detection in the LiDAR. When the condition is met, the gain of the receiver within the light leading period is adjusted to reduce the quantity of the light leading point cloud points, thereby reducing the impact of dirt and other factors on normal detection.

Figure 2:
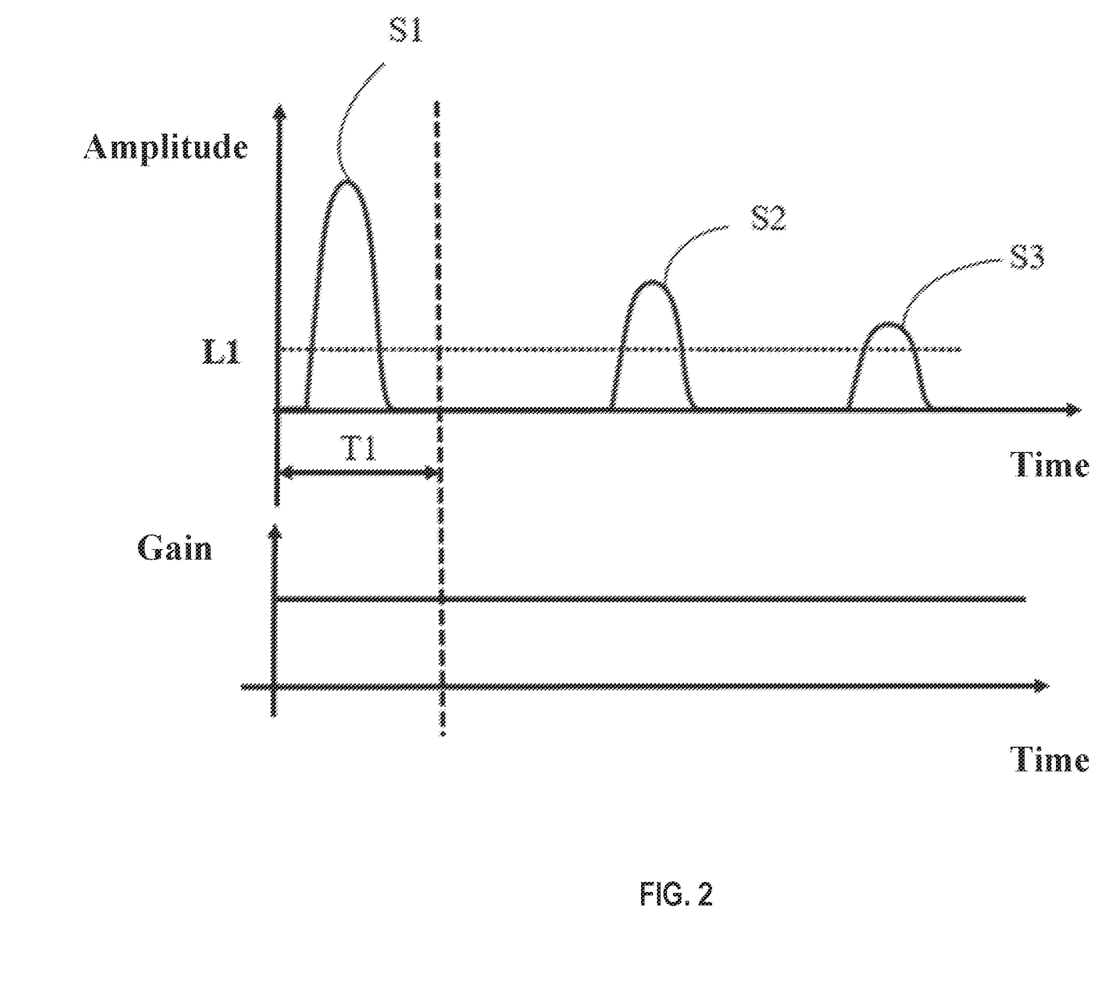
FIGS. 2 and 3 illustrate examples of two different values of the gain of the receiver and the schematic diagram of the echo signal under these two examples, according to an embodiment of this application.
Figure 3:
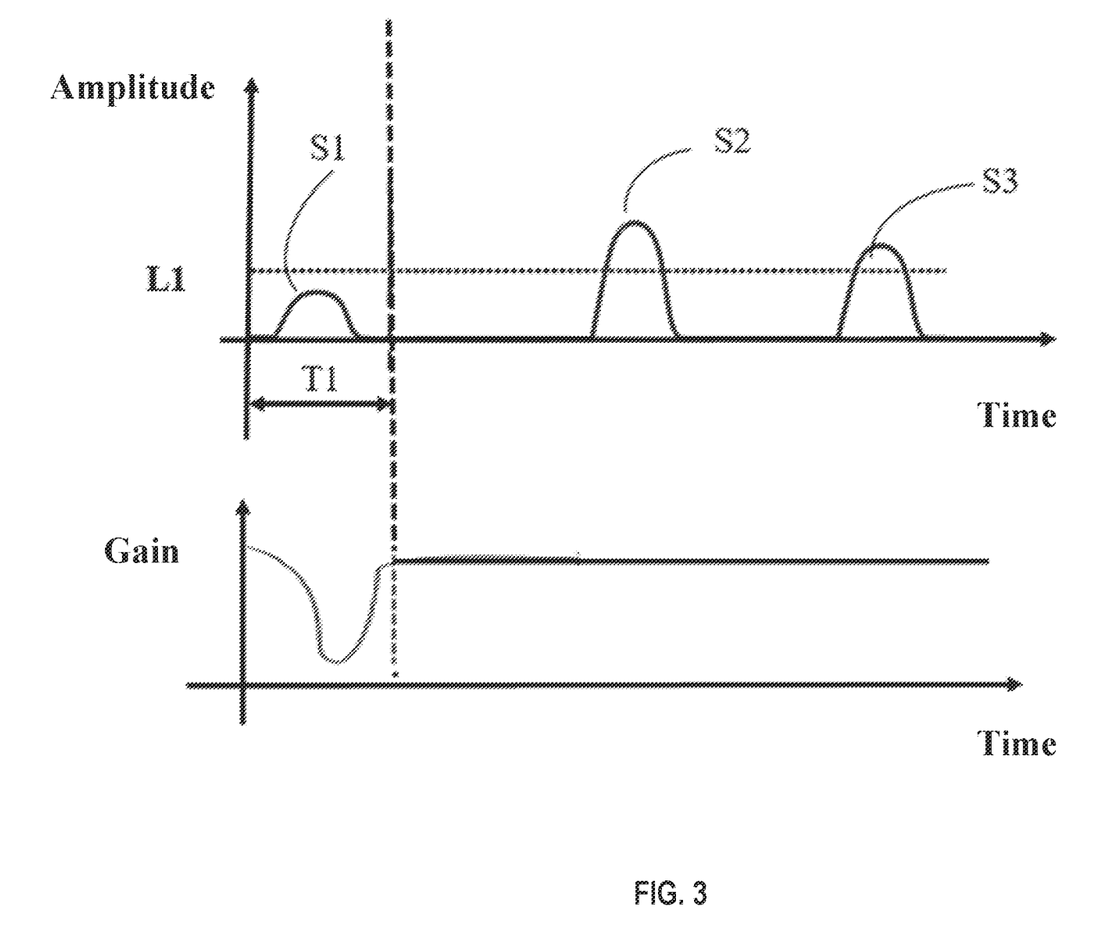

FIGS. 2 and 3 illustrate examples of two different values of the gain of the receiver and the schematic diagram of the echo signal under these two examples, according to an embodiment of this application.

In FIG. 2, the gain of the receiver is the same during the light leading period T1 and after the light leading period T1. For the same gain, the echoes reflected by objects farther away from the LiDAR are generally weaker. Signals with amplitudes exceeding the detection threshold L1 are generally considered as echoes reflected by objects. As shown in FIG. 2, the light leading signal S1 exceeding the detection threshold L1 is detected during the light leading period T1, and after the light leading period T1, signals S2 and S3 exceeding the detection threshold are also detected, corresponding to objects 1 and 2, respectively. However, in practical applications, if the amplitude of the light leading signal S1 is greater than the amplitude of signals S2 or S3, it may cause signals S2 and S3 to be submerged within the falling edge of the light leading signal S1 and therefore cannot be identified, or because the signal with the highest amplitude is considered as the object echo signal, the light leading signal S1 is mistakenly recognized as the object echo signal, ignoring the actual object echo signals S2 or S3.

When reducing the gain of the receiver within the light leading period, the amplitude of the light leading signals within the light leading period decreases significantly. In FIG. 3, the amplitude of at least one light leading signal S1 decreases to below the detection threshold L1, which does not affect the detection of signals S1 and S2. In some embodiments, the LiDAR sets the gain of the receiver as shown in FIG. 3, so that the light leading signals do not trigger the detection threshold and therefore are not detected. The appearance of dirt causes the enhancement of light leading signals, triggering the detection threshold and detecting the light leading signals. Therefore, by detecting whether the quantity of light leading point cloud points in the first preset region meets the first preset condition, it is possible to detect factors such as dirt that may affect the normal detection of the LiDAR.

In some embodiments, reducing or increasing the gain of the receiver can be achieved by adjusting the depth of the concavity of the gain curve in FIG. 3 within the light leading period T1. In some embodiments, adjusting the phase of the gain curve of the receiver within the light leading period can be done to adjust the gain of the receiver during the light leading period. Taking FIG. 3 as an example, the phase of the rising edge of the gain curve in FIG. 3 within the light leading period T1 can be adjusted, for instance, by shifting the rising edge to the left to decrease the gain of the receiver during the light leading period T1, or by shifting the rising edge to the right to increase the gain of the receiver during the light leading period T1. The leading generated on the window slice of the LiDAR is relatively abundant, and the leading signal there is most likely to overlap and cause confusion with the echo signals of nearby detection targets; by adjusting the phase of the rising edge of the gain curve, this leading signal gain can be adjusted. Moreover, adjusting the phase only requires adjusting the start and end times of the gain curve, without changing the gain curve. Compared to the solution of adjusting the depth of the concavity of the gain curve in FIG. 3 within the light leading period T1, adjusting the phase is easier to implement in hardware and simpler to control. The step size of shifting the rising edge to the left or right can depend on the frequency of the system clock of the control system, for example, the step size of this left or right shift equals one of the multiple frequencies of the system clock.

In some embodiments, the first preset region may be selected as an area with a higher point cloud density within the field of view. For example, the first preset region includes at least a part of the region below the horizontal line in the field of view. In some embodiments, the LiDAR is mounted on a moving vehicle to detect areas in front, on the sides, or behind the vehicle. In the field of view above the horizontal line of the LiDAR, there are often fewer point cloud points in the area above the horizontal line in a frame of point cloud due to scenes such as the sky or other unobstructed objects, while in the field of view below the horizontal line, the presence of the ground results in a larger number of point cloud points in a frame of point cloud below the horizontal line, making the point cloud more complete. By counting the quantity of light leading point cloud points in at least a part of the region below the horizontal line in the field of view, the impact of dirt on the larger quantity of point cloud points in that region can be better reflected.

In some embodiments, step S101 also includes determining whether the selection of the first preset region in the current frame of point cloud is appropriate. In some embodiments, in step S101, when both conditions are met: (1) the quantity of point cloud points in the first preset region in the current frame of point cloud is greater than the quantity of point cloud points in a third preset region, and (2) the difference between the quantity of point cloud points in the first preset region and the quantity of point cloud points in the third preset region satisfies a second preset condition, then the quantity of light leading point cloud points in the first preset region in the current frame of point cloud is obtained. The third preset region is a partial region in the field of view corresponding to the current frame of point cloud, other than the first preset region. In general, the distribution of objects in the field of view of a LiDAR in a normal scenario is uneven, for example, in a vehicular scenario, objects in the field of view of the LiDAR are mainly below the horizontal line. By satisfying the aforementioned conditions (1) and (2), it can be determined that the current frame of point cloud represents a relatively normal scenario, and the selected first preset region is an area with a higher point cloud density. In an embodiment, the first preset region is located below the horizontal line in the field of view, while the third preset region is located above the horizontal line in the field of view.

In an embodiment, when either of the conditions (1) and (2) is not met, the first preset region can be replaced, and an area in the current frame of point cloud that simultaneously meets both condition (1) and condition (2) can be searched for as the new first preset region. In some embodiments, the current frame of point cloud can be skipped, and the quantity of light leading point cloud points in the first preset region in the next frame of point cloud can be obtained.

In an embodiment, the difference between the quantity of point cloud points in the first preset region and the quantity of point cloud points in the third preset region satisfying the second preset condition can be that the difference is greater than a preset value or greater than a preset ratio of the quantity of point cloud points in the first preset region, which is not limited herein.

In step S102, the adjustment of the gain of the receiver can be a one-time adjustment or, after step S102, there can be at least one adjustment determination. The adjustment determination includes determining the next adjustment mode based on the quantity of valid point cloud points before and after the most recent gain adjustment. After each adjustment determination, the gain of the receiver within the light leading period is adjusted according to the next adjustment mode.

For example, in a subsequent adjustment determination after step S102, obtain a first quantity and a second quantity. The first quantity is determined based on the quantity of valid point cloud points in a second preset region in at least one frame of point cloud generated before adjustment in step S102, and the second quantity is determined based on the quantity of valid point cloud points in the second preset region in at least one frame of point cloud generated after adjustment in step S102. Here, the valid point cloud point refers to a point cloud point in a frame of point cloud other than the light leading point cloud point. The physical meaning of these valid point cloud points is the points in the point cloud reflected by objects in the external environment of the LiDAR. In an embodiment, the LiDAR can determine the quantity of valid point cloud points by first identifying non-valid point cloud points in a frame of point cloud through other means before counting the valid point cloud points.

The second preset region may be the same as or different from the first preset region. In an embodiment, the second preset region includes at least a part of a region within the field of view below a horizontal line. In an embodiment, the second preset region is the region below the horizontal line in the field of view with the highest point cloud density.

In this adjustment determination, after obtaining the first quantity and the second quantity, the next adjustment mode of the gain of the receiver within the light leading period is determined based on the first quantity and the second quantity. By obtaining the change in the quantity of valid point cloud points before and after adjustment, it can be determined whether the adjustment in step S102 can bring benefits to the point cloud data, to assess the necessity of the adjustment in step S102, and/or determine how to adjust next.

In an embodiment, when the difference between the second quantity and the first quantity is greater than the first threshold, the next adjustment mode includes reducing the gain of the receiver within the light leading period. When the adjustment in step S102 can increase the quantity of valid point cloud points, it indicates that there may still be room for further optimization, so it is possible to continue trying to reduce the gain of the receiver within the light leading period.

In an embodiment, when the difference between the first quantity and the second quantity is greater than the second threshold, the next adjustment mode includes increasing the gain of the receiver within the light leading period. When the adjustment in step S102 significantly reduces the quantity of valid point cloud points, it means that the adjustment of the gain has exceeded the target value (i.e., the gain corresponding to the maximum benefit of valid point cloud data). Therefore, an attempt can be made to adjust the gain of the receiver within the light leading period back to approach this value.

In an embodiment, when the difference between the second quantity and the first quantity is not greater than the first threshold, and the difference between the first quantity and the second quantity is not greater than the second threshold, the next adjustment mode includes restoring the gain of the receiver within the light leading period to the gain before the most recent adjustment. The first threshold and the second threshold can be the same or different. When the adjustment in step S102 does not result in a significant change in the quantity of valid point cloud points, it indicates that the gain before adjustment is close to the target value, as the gain of the receiver within the light leading period is restored to the gain before this adjustment. In an embodiment, instead of restoring a gain to the gain before adjustment, it can be maintained at the gain after the adjustment in step S102.

After step S102, in an example of performing at least one adjustment determination, the adjacent two adjustment determinations can be separated by at least one frame of point cloud. For example, when obtaining the first quantity, the first quantity can be determined based on the quantity of valid point cloud points in a second preset region in a frame of point cloud generated before adjustment in step S102, for example, the first quantity equals the quantity of valid point cloud points in the second preset region in that frame of point cloud. When obtaining the second quantity, the second quantity can be determined based on the quantity of valid point cloud points in the second preset region in a frame of point cloud generated after adjustment in step S102, for example, the second quantity equals the quantity of valid point cloud points in the second preset region in that frame of point cloud.

For example, when obtaining the first quantity, the first quantity can be determined based on the quantity of valid point cloud points in the second preset region of at least two frames of point cloud before adjustment. In an embodiment, the first quantity equals the average or sum of the quantity of valid point cloud points in the second preset region of the at least two frames of point cloud, to reduce measurement errors. The gain of the receiver corresponding to the at least two frames of point cloud remains unchanged; when obtaining the second quantity, the second quantity can be determined based on the quantity of valid point cloud points in the second preset region of at least two frames of point cloud after adjustment. For example, the second quantity equals the average or sum of the quantity of valid point cloud points in the second preset region of the at least two frames of point cloud, to reduce measurement errors.

After step S102, in the example of performing at least one adjustment determination, the time interval between two consecutive adjustment determinations when the LiDAR is in motion is greater than the time interval between two consecutive adjustment determinations when the LiDAR is stationary. When the LiDAR is stationary, due to the fact that the relative positions of most objects around it remain basically unchanged or change slowly, the quantity of point cloud points corresponding to objects detected by the LiDAR in consecutive frames of point cloud remains relatively constant, so an adjustment determination can be made every one frame or every two frames. When the LiDAR is in motion, relative to most objects around it, the LiDAR is dynamic, and the quantity of valid point cloud points can be determined statistically, for example, an adjustment determination can be made every at least three frames.

After step S102, in examples where at least one adjustment determination is further performed, there can be multiple frequencies for the adjustment determination. For example, the first quantity can be determined based on the quantity of valid point cloud points in the second preset region of the n frames of point cloud before the adjustment, and the second quantity can be determined based on the quantity of valid point cloud points in the second preset region of the m frames of point cloud before the adjustment, where n and m are integers greater than or equal to 1. The quantity of frames between two consecutive adjustment determinations can be equal to n+m or greater than n+m.

In an embodiment, when after the most recent adjustment of the gain, if the difference between the second quantity and the first quantity is not greater than the first threshold, or the difference between the first quantity and the second quantity is not greater than the second threshold, the gain of the receiver within the light leading period is restored to the gain before the most recent adjustment, and the adjustment determination is stopped, as well as stopping the next adjustment of the gain of the receiver within the light leading period. In an embodiment, when the quantity of the light leading point cloud points in the frame of point cloud obtained after the most recent adjustment of the gain does not satisfy the first preset condition, the adjustment determination is stopped, and the next adjustment of the gain of the receiver within the light leading period is stopped.

In some embodiments, after the most recent adjustment of the gain, when the quantity of the light leading point cloud points does not meet the first preset condition, the gain of the receiver within the light leading period is restored to a default value. In practical applications, the window dirt of the LiDAR may be cleaned, and if the quantity of the light leading point cloud points does not satisfy the first preset condition, the gain can be restored to the default value. The quantity of light leading point cloud points in the first preset region is then obtained at certain time intervals until the first preset condition is met to resume gain adjustment.

Below is an embodiment to illustrate the laser ranging method, the quantity of light leading point cloud points in a first preset region of the point cloud frame is obtained at intervals of the first duration. When it is detected that the quantity of light leading point cloud points in the first preset region of a frame of point cloud is greater than a preset threshold, the gain of the receiver within the light leading period is reduced by a first step length.

After reducing the gain, adjustments are made and the next adjustment is determined accordingly. The total quantity of light leading point cloud points in the first preset region in each point cloud frame within the second preset duration before the adjustment is calculated to obtain the first quantity, and the total quantity of light leading point cloud points in the first preset region in each point cloud frame within the second preset duration after the adjustment is calculated to obtain the second quantity. The second duration is less than or equal to the first duration. Based on the first quantity and the second quantity, one of the following scenarios (1), (2), or (3) is executed.

Case (1): If the difference between the second quantity and the first quantity is greater than threshold 1, continue to reduce the gain of the receiver within the light leading period by a first step length. Case (2): If the difference between the first quantity and the second quantity is greater than threshold 1, increase the gain of the receiver within the light leading period by a second step length, where the first step length and the second step length can be the same or different. Case (3): If the absolute value of the difference between the first quantity and the second quantity is less than threshold 1, restore the gain of the receiver within the light leading period to the gain before the most recent adjustment.

For case (1) or case (2), repeat the above adjustment determination and the corresponding next adjustment. For case (3), stop the next adjustment determination and stop the corresponding next adjustment.

The above example describes reducing the gain of the receiver within the light leading period when the quantity of the light leading point cloud points is greater than a preset threshold. In an embodiment, when the quantity of the light leading point cloud points is greater than a preset threshold, the gain of the receiver can also be increased in the ranging period after the light leading period and before the next light leading period. Due to the influence of window contamination, the received object echo signals in the ranging period may weaken. Increasing the gain of the receiver in the ranging period can compensate for this weakening, making it easier to detect the corresponding object echo signals.

Figure 4:
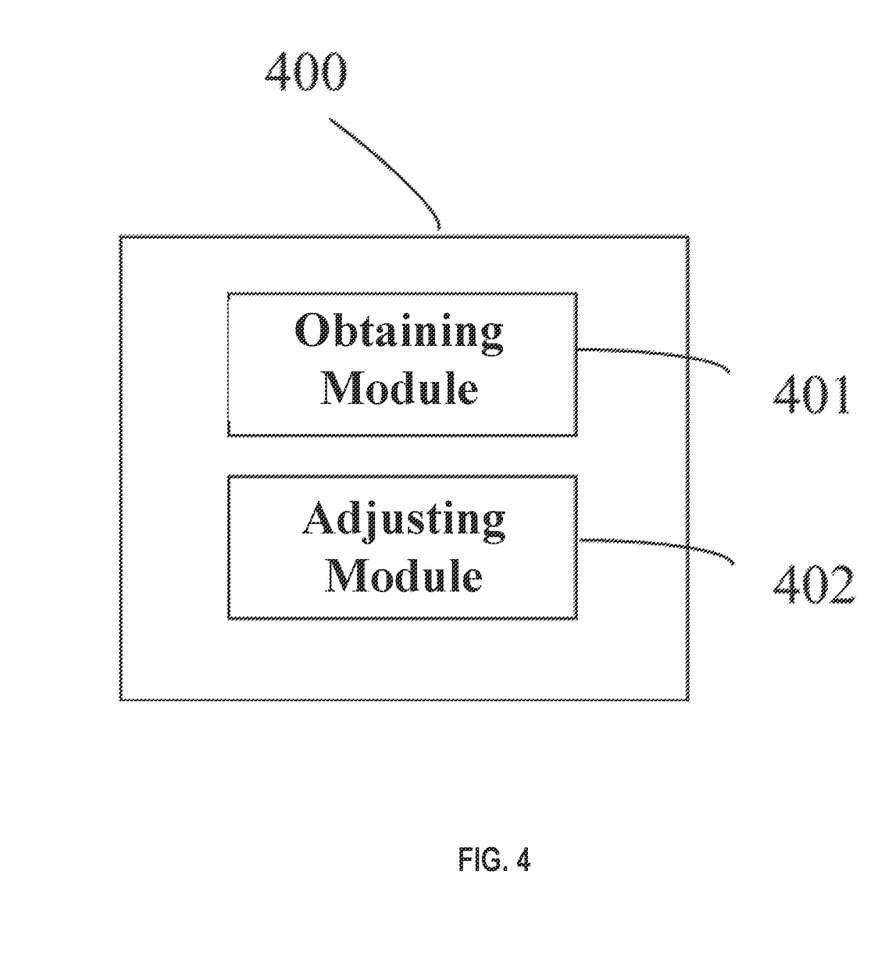
FIG. 4 illustrates a schematic diagram of an embodiment of the laser ranging device, according to an embodiment of this application.

FIG. 4 illustrates a schematic diagram of an embodiment of the laser ranging device, according to an embodiment of this application.

Embodiments of the present application further provide a laser ranging device. The laser ranging device 400 includes: an obtaining module 401, used to acquire a quantity of light leading point cloud points in the first preset region in the current frame of point cloud, where the light leading point cloud points are point cloud points corresponding to echoes received by a receiver within a light leading period, and the light leading period is a period less than a first preset duration, starting from an emission moment of a laser beam corresponding to the light leading point cloud points; an adjusting module 402, configured to adjust the gain of the receiver within the light leading period to reduce the quantity of the light leading point cloud points when the quantity of the light leading point cloud points satisfies a first preset condition.

In an embodiment, the adjusting module 402 is used to reduce the gain of the receiver within the light leading period when the quantity of the light leading point cloud points is greater than a preset threshold.

In an embodiment, the device 400 further includes: a determining module, used to determine the preset threshold according to the current scanning mode before adjusting the gain of the receiver within the light leading period when the quantity of the light leading point cloud points satisfies the first preset condition. The current scanning mode is one of at least two scanning modes, and preset thresholds corresponding to the at least two scanning modes have different values.

In an embodiment, the adjusting module 402, when adjusting the gain of the receiver within the light leading period to reduce the quantity of the light leading point cloud points, configured to: adjust the phase of the gain curve of the receiver within the light leading period to reduce the quantity of the light leading point cloud points.

In an embodiment, the device 400 further includes a determination module, which is used to perform at least one adjustment determination, where the adjustment determination includes determining a next adjustment mode according to a quantity of at least some valid point cloud points before and after the most recent gain adjustment.

The adjusting module is further used to adjust the gain of the receiver within the light leading period according to the next adjustment mode after each adjustment determination.

The valid point cloud point is a point cloud point in a frame of point cloud other than the light leading point cloud point.

In an embodiment, the determination module is configured to obtain a first quantity and a second quantity, where the first quantity is determined based on the quantity of valid point cloud points in a second preset region in at least one frame of point cloud generated before the adjustment, and the second quantity is determined based on the quantity of valid point cloud points in the second preset region in at least one frame of point cloud generated after the adjustment; and determine the next adjustment mode of the gain of the receiver within the light leading period according to the first quantity and the second quantity.

In an embodiment, determine the next adjustment mode of the gain of the receiver within the light leading period according to the first quantity and the second quantity includes at least one of the following steps.

a) When the difference between the second quantity and the first quantity is greater than the first threshold, the next adjustment mode includes further reducing the gain of the receiver within the light leading period.
  b) When the difference between the first quantity and the second quantity is greater than the second threshold, the next adjustment mode includes increasing the gain of the receiver within the light leading period.
  c) When the difference between the second quantity and the first quantity is not greater than the first threshold and the difference between the first quantity and the second quantity is not greater than the second threshold, the next adjustment mode includes restoring the gain of the receiver within the light leading period to the gain before the most recent adjustment.

In an embodiment, the first preset region and the second preset region are the same.

In an embodiment, the first preset region and/or the second preset region include at least a part of a region within a field of view below a horizontal line.

In an embodiment, the first preset region and/or the second preset region are the areas with the highest point cloud density in the field of view below a horizontal line.

In an embodiment, when the quantity of light leading point cloud points in a frame of point cloud obtained after the most recent adjustment of the gain does not meet the first preset condition, the adjustment determination is stopped, and the next adjustment of the gain of the receiver within the light leading period is stopped.

In an embodiment, the device 400 further includes a restoration module, which is configured to restore the gain of the receiver within the light leading period to a default value when the quantity of the light leading point cloud points does not satisfy the first preset condition.

In an embodiment, when the obtaining module 401 is configured to obtain the quantity of light leading point cloud points in the first preset region in the current frame of point cloud, when the quantity of point cloud points in the first preset region in the current frame of point cloud is greater than the quantity of point cloud points in a third preset region, and the difference between the quantity of point cloud points in the first preset region and the quantity of point cloud points in the third preset region satisfies a second preset condition, where the third preset region is a partial region in the field of view corresponding to the current frame of point cloud, other than the first preset region.

In an embodiment, the first preset region is located below the horizontal line in the field of view, and the third preset region is located above the horizontal line in the field of view.

Figure 5:
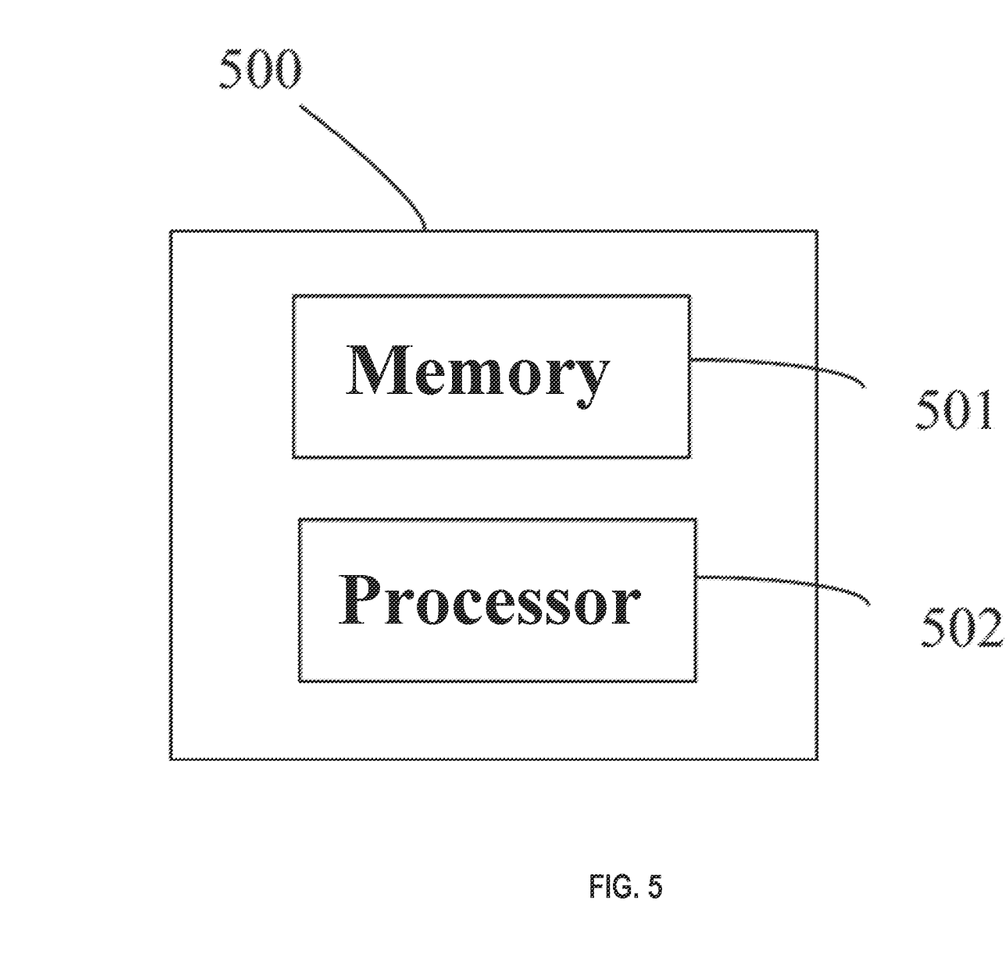
FIG. 5 illustrates a schematic diagram of an embodiment of the LiDAR, according to an embodiment of this application.

FIG. 5 illustrates a schematic diagram of an embodiment of the LiDAR, according to an embodiment of this application. The LiDAR 500 includes a memory 501 and a processor 502.

The processor 502 can be a Central Processing Unit (CPU), or general processor, Digital Signal Processor (DSP), Application Specific Integrated Circuit (ASIC), Field-Programmable Gate Array (FPGA), or other programmable logic devices, discrete gates or transistor logic devices, discrete hardware components, etc. The general processor can be a microprocessor or any conventional processor.

The memory 501 may include various types of storage units, such as system memory, read-only memory (ROM), and permanent storage devices. ROM can store static data or instructions required by the processor 502 or other modules of the computer. The permanent storage device can be a writable storage device that retains instructions and data even when the computer is powered off, making it a non-volatile storage device. In some embodiments, large-capacity storage devices (such as magnetic or optical disks, flash memory) are used as permanent storage devices. In other embodiments, the permanent storage device can be a removable storage device (such as floppy disks, optical drives). System memory can be a writable storage device or a volatile writable storage device, such as dynamic random-access memory. System memory can store some or all of the instructions and data required by the processor during operation. Memory 61 may include a combination of any non-transitory computer-readable storage media, including various types of semiconductor storage chips (such as DRAM, SRAM, SDRAM, flash memory, programmable read-only memory), as well as disks and/or optical discs. In some embodiments, memory 510 may include removable storage devices that are readable and/or writable, such as compact discs (CDs), read-only digital versatile discs (DVD-ROM, dual-layer DVD-ROM), read-only Blu-ray discs, high-density optical discs, flash memory cards (such as SD cards, mini SD cards, Micro-SD cards), magnetic floppy disks, and so on. Non-transitory computer-readable storage media does not include carriers and instantaneous electronic signals transmitted wirelessly or wired.

The memory 501 stores executable codes. When the executable codes are processed by the processor 502, the processor 502 can execute some or all of the methods described above.

The method according to embodiments of the present application can also be implemented as a computer program or a computer program product. The computer program or computer program product includes computer program code instructions for executing some or all of the steps in the method described in the present application.

The method according to embodiments of the present application may be implemented as a computer-readable storage medium (or non-transitory machine-readable storage medium or machine-readable storage medium) storing executable code (or computer program or computer instruction code). When the executable code (or computer program or computer instruction code) is executed by a processor of an electronic device (or server, etc.), the processor performs part or all of the steps of the method.

What is claimed is:

1. A laser ranging method, comprising:
obtaining a quantity of light leading point cloud points in a first preset region in a current frame of point cloud, wherein the light leading point cloud points are point cloud points corresponding to echoes received by a receiver within a light leading period, and the light leading period is a period less than a first preset duration, starting from an emission moment of a laser beam corresponding to the light leading point cloud points; and
when the quantity of the light leading point cloud points satisfies a first preset condition, keeping a gain of the receiver after the light leading period unchanged, and adjusting a phase of a rising edge of a gain curve of the receiver within the light leading period by left-shifting the rising edge of the gain curve of the receiver to decrease the gain of the receiver and reduce the quantity of the light leading point cloud points, wherein left-shifting the rising edge of the gain curve involves advancing starting and ending times of the gain curve of the receiver, and a step size for left-shifting the rising edge depends on a frequency of a system clock.

2. The method according to claim 1, wherein when the quantity of the light leading point cloud points satisfies a first preset condition, keeping the gain of the receiver after the light leading period unchanged, and adjusting a phase of a rising edge of a gain curve of the receiver within the light leading period comprises:
when the quantity of the light leading point cloud points is greater than a preset threshold, keeping the gain of the receiver after the light leading period unchanged, reducing the gain of the receiver within the light leading period.

3. The method according to claim 2, wherein before keeping the gain of the receiver after the light leading period unchanged and adjusting a phase of a rising edge of a gain curve of the receiver within the light leading period, the method further comprises:
determining the preset threshold according to a current scanning mode, wherein the current scanning mode is one of at least two scanning modes, and preset thresholds corresponding to the at least two scanning modes have different values.

4. The method according to claim 1, further comprising:
determining a next adjustment mode according to a quantity of at least some valid point cloud points before and after a most recent gain adjustment; and
adjusting the gain of the receiver within the light leading period according to the next adjustment mode,
wherein the valid point cloud point is a point cloud point in the frame of point cloud other than the light leading point cloud point.

5. The method according to claim 4, further comprising:
obtaining a first quantity and a second quantity, wherein the first quantity is determined according to a quantity of valid point cloud points in a second preset region in at least one frame of point cloud generated before adjustment, and the second quantity is determined according to a quantity of valid point cloud points in the second preset region in at least one frame of point cloud generated after the adjustment; and
determining the next adjustment mode of the gain of the receiver within the light leading period according to the first quantity and the second quantity.

6. The method according to claim 5, wherein the determining the next adjustment mode of the gain of the receiver within the light leading period according to the first quantity and the second quantity comprises at least one of the following:
a) when a difference between the second quantity and the first quantity is greater than a first threshold, the next adjustment mode comprises further reducing the gain of the receiver within the light leading period;
b) when a difference between the first quantity and the second quantity is greater than a second threshold, the next adjustment mode comprises increasing the gain of the receiver within the light leading period; or
c) when the difference between the second quantity and the first quantity is not greater than the first threshold or the difference between the first quantity and the second quantity is not greater than the second threshold, the next adjustment mode comprises includes restoring the gain of the receiver within the light leading period to the gain before the most recent adjustment.

7. The method according to claim 5, wherein the first preset region is as same as the second preset region.

8. The method according to claim 5, wherein the first preset region and/or the second preset region comprises at least a part of a region within a field of view below a horizontal line of a LiDAR.

9. The method according to claim 4, wherein when the quantity of the light leading point cloud points in the frame of point cloud obtained after the most recent gain adjustment does not satisfy the first preset condition, the method further comprises: stopping the adjustment determination, and stopping the next adjustment of the gain of the receiver within the light leading period.

10. The method according to claim 4, further comprising:
when the quantity of the light leading point cloud points does not satisfy the first preset condition, restoring the gain of the receiver within the light leading period to a default value.

11. The method according to claim 1, wherein the obtaining the quantity of the light leading point cloud points in the first preset region in the current frame of point cloud comprises:
when a quantity of the point cloud points in the first preset region in the current frame of point cloud is greater than a quantity of point cloud points in a third preset region, and a difference between the quantity of the point cloud points in the first preset region and the quantity of the point cloud points in the third preset region satisfies a second preset condition, obtaining the quantity of the light leading point cloud points in the first preset region in the current frame of point cloud, wherein the third preset region is a partial region in a field of view corresponding to the current frame of point cloud, other than the first preset region.

12. The method according to claim 11, wherein the first preset region is a region below a horizontal line of a LiDAR in the field of view, and the third preset region is a region above the horizontal line of the LiDAR in the field of view.

13. A LiDAR, comprising:
a processor; and
a memory, on which executable codes are stored, when executed by the processor, the executable codes cause the LiDAR to perform a laser ranging method according to claim 1.

* * * * *